United States Patent
Misaka

(10) Patent No.: US 7,558,437 B2
(45) Date of Patent: Jul. 7, 2009

(54) METHOD AND APPARATUS FOR IMAGE PROCESSING

(75) Inventor: Naoyuki Misaka, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1026 days.

(21) Appl. No.: 11/079,891

(22) Filed: Mar. 15, 2005

(65) Prior Publication Data

US 2006/0209367 A1 Sep. 21, 2006

(51) Int. Cl.
G06K 9/38 (2006.01)
H04N 1/40 (2006.01)
H04N 1/38 (2006.01)
H04N 1/04 (2006.01)

(52) U.S. Cl. ............... 382/275; 358/461; 358/474; 358/463

(58) Field of Classification Search ........... 358/474, 358/1.9, 2.1, 448, 461, 465, 466, 471, 463; 382/274; 250/492.2, 208.1; 354/445
See application file for complete search history.

(56) References Cited

U.S. PATENT DOCUMENTS

| 5,168,377 | A | * | 12/1992 | Nagano | 358/471 |
| 5,930,008 | A | * | 7/1999 | Nabeshima et al. | 358/496 |
| 6,600,579 | B1 | * | 7/2003 | Kumagai et al. | 358/474 |
| 7,161,626 | B1 | * | 1/2007 | Nara | 348/243 |
| 7,352,495 | B2 | * | 4/2008 | Sugeta | 358/474 |
| 7,375,864 | B2 | * | 5/2008 | Kanno | 358/483 |
| 2002/0036805 | A1 | * | 3/2002 | Kanno et al. | 358/445 |
| 2002/0050556 | A1 | * | 5/2002 | Nagashima | 250/208.1 |
| 2002/0135812 | A1 | * | 9/2002 | Inage | 358/401 |
| 2003/0062487 | A1 | * | 4/2003 | Hiroi et al. | 250/492.2 |
| 2004/0052554 | A1 | * | 3/2004 | Harada et al. | 399/301 |
| 2006/0066921 | A1 | * | 3/2006 | Saka et al. | 358/474 |
| 2007/0002393 | A1 | * | 1/2007 | Okawa | 358/462 |

FOREIGN PATENT DOCUMENTS

| JP | 11-289432 A | 10/1999 |
| JP | 2001-45288 A | 2/2001 |
| JP | 2002-300392 A | 10/2002 |
| JP | 02006129296 | * 5/2006 |

* cited by examiner

*Primary Examiner*—Jerome Grant, II
(74) *Attorney, Agent, or Firm*—Foley & Lardner LLP

(57) ABSTRACT

In an image reading apparatus, the invention provides a method for detecting foreign matter which may adhere to a white reference plate, and correcting a reference value when foreign matter is detected. The method includes computing an average of read values, comparing an absolute value of difference between the computed average value and data of the next read position to a predetermined threshold, and when a determining unit determines that foreign matter adheres to the reference plate, replacing the average value used for the determination of whether or not the foreign matter adheres to the reference plate with the read data.

13 Claims, 8 Drawing Sheets

METHOD AND APPARATUS FOR IMAGE PROCESSING

BACKGROUND OF THE INVENTION

1. Field of the Invention

The present invention relates to an image reading apparatus for reading an image output from an image forming apparatus, such as an electrophotographic apparatus and a laser printer, and an image processing method for processing the image read by the image reading apparatus.

2. Description of the Related Art

In an image reading apparatus, a reference value for performing photoelectric conversion of a read object to image information is set in successively reading image information or at predetermined timing. In many cases, the image information (reference value) read over plural lines is averaged.

Jpn. Pat. Appln. KOKAI Publication No. 11-289432 discloses a method for determining a reference value using a statistical technique in averaging data obtained by reading white reference data of several lines. According to Jpn. Pat. Appln. KOKAI Publication No. 11-289432, it is described that the method can decrease influence of foreign matter adhering to a white reference plate.

In the method using the averaging or the method the statistical technique, when the foreign matter adhering to the white reference plate is small to a certain degree in performing detection and removal of the foreign matter and correction, large fluctuation is seldom provided to the white reference value. On the other hand, when the foreign matter adhering to the white reference plate is large such that the foreign matter exists across plural pixels, there is a problem that the white reference value becomes inaccurate.

BRIEF SUMMARY OF THE INVENTION

An object of the invention is to provide a white reference value reading method and a foreign matter detecting and correcting method which can obtain a good white reference value regardless of a size of foreign matter which may adhere to a white reference plate in an image reading apparatus and an image processing method.

The invention provides an image processing apparatus comprising:

a CCD sensor which includes at least one line sensor, and which performs photoelectric conversion of image information of a reading object to output an electric signal corresponding to the image information;

an average value computing unit which determines an average value of read values in each line of a reference plate when shading correction is performed using the read value obtained by reading the reference plate with the CCD sensor;

a comparison computing unit which compares a difference between the average value computed by the average value computing unit and data of a next read position;

a determining unit which determines whether or not a foreign matter adheres to the reference plate based on the comparison result of the comparison computing unit; and a control unit which repeats the computation of the average value by the average value computing unit, the data comparison by the comparison computing unit, and the determination by the determining unit up to the necessary number of lines.

The invention further provides an image processing apparatus comprising:

a CCD sensor which includes at least one line sensor and which performs photoelectric conversion of image information of a reading object to output an electric signal corresponding to the image information;

an average value computing unit which determines an average value of read values in each line of a reference plate when shading correction is performed using the read value obtained by reading the reference plate with the CCD sensor;

a comparison computing unit which compares a difference between the average value computed by the average value computing unit and data of a next read position;

a determining unit which determines whether or not foreign matter adheres to the reference plate based on the comparison result of the comparison computing unit;

a control unit which repeats the computation of the average value by the average value computing unit, the data comparison by the comparison computing unit, and the determination by the determining unit up to the necessary number of lines; and a comparing unit which determines whether or not the average value which becomes a first reference is data in which the foreign matter is read.

The invention still further provides an image processing method comprising:

including at least one line sensor, and performing photoelectric conversion of image information of a reading object to obtain an electric signal corresponding to the image information;

determining an average value of read values in each line of a reference plate when shading correction is performed using the read value obtained by reading the reference plate;

comparing a difference between the average value computed by an average value computing unit and data of a next read position;

determining whether or not a foreign matter adheres to the reference plate based on the comparison result; and repeating the computation of the average value, the data comparison and the determination up to the necessary number of lines.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
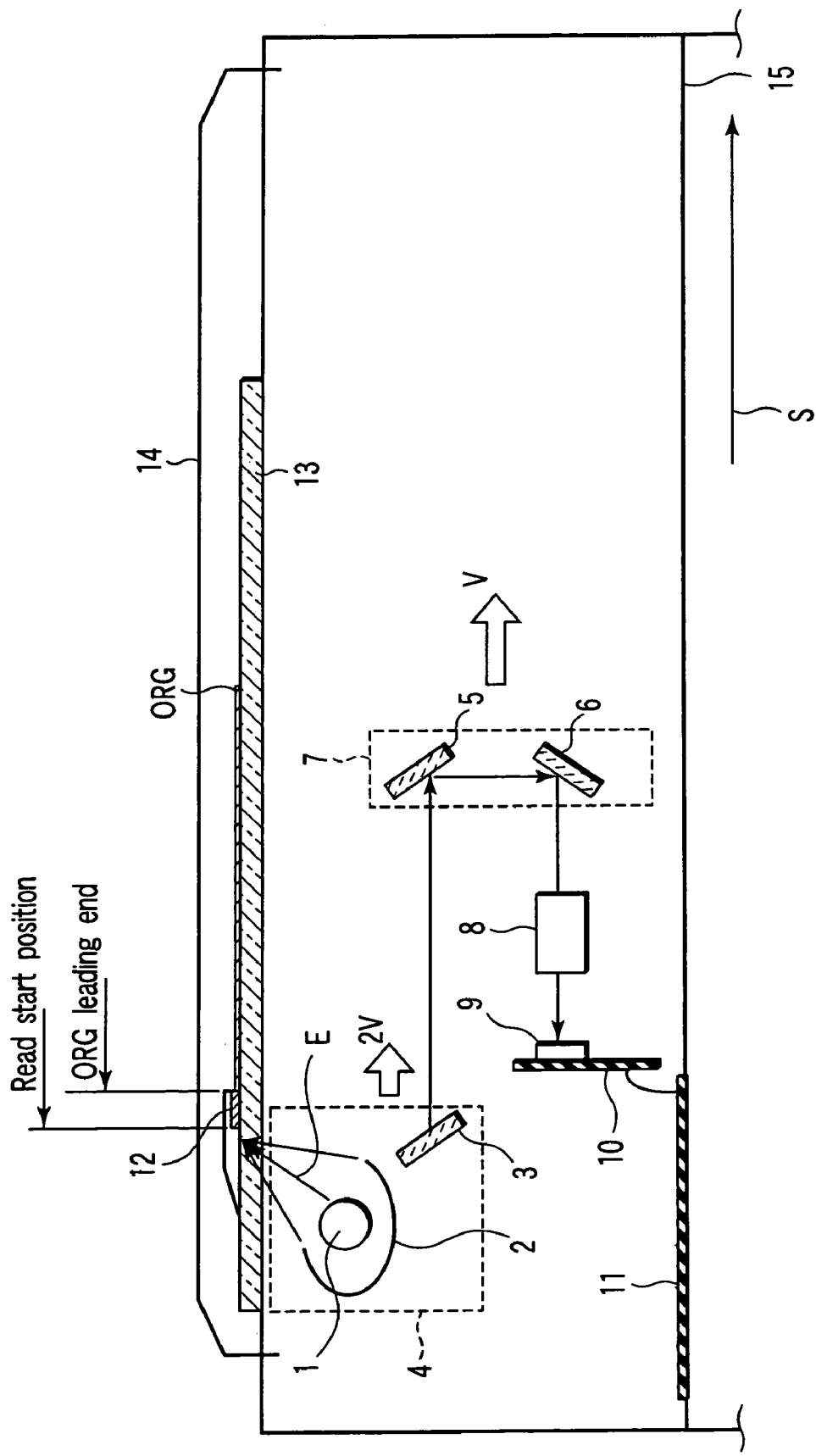
FIG. 1 is a schematic view for explaining an example of an image reading apparatus to which an embodiment of the invention is applied.

Referring now to the drawings, embodiments of the invention will be described.

FIG. 1 shows an example of an image reading apparatus to which an embodiment of the invention is applied.

As shown in FIG. 1, the image reading apparatus (scanner) has a predetermined length in a direction orthogonal to an arrow S to include a lamp (light source) 1 which emits light having a predetermined wavelength distribution (color). The light source 1, a reflector 2, and a first mirror 3 are held by a first carriage 4 which is moved in the direction of the arrow S. The reflector 2 is used to correct light distribution characteristics in a longitudinal direction of the light source 1, of the light emitted from the light source 1, and to condense the light in a predetermined direction (direction of arrow E).

A second mirror 5 which bends the light reflected from the first mirror 3 at right angles, and a third mirror 6 which further bends the light incident from the second mirror 5 at right angles are provided in the direction (direction of arrow S) in which the light reflected from the first mirror 3 held by the first carriage 4 is guided. The second mirror 5 and the third mirror 6 are held by a second carriage 7 which is moved in the direction of the arrow S in association with the first carriage 4.

The image of the light reflected from the third mirror 6 is formed onto a light reception surface of a CCD sensor 9 by a condenser lens (magnification setting lens) 8. The CCD sensor 9 is fixed at a predetermined position of a chassis 15 through a drive circuit board (CCD sensor board) 10. Sensor output output from the CCD sensor board 10 is supplied to a signal processing board 11.

The illuminating light from the light source 1 and the reflector 2 are condensed on a white reference plate 12 and a document glass 13 provided at predetermined positions on the chassis 15.

A reading object having image information to be read, i.e., an original ORG is set on the document glass 13. The original ORG can have an arbitrary shape and thickness which are represented by, for example, a sheet medium, a book, and a solid. The original ORG is brought into close contact with the document glass 13 by a document presser (cover) 14.

The light, i.e. lighting from the light source 1 and the reflector 2 is focused in a predetermined direction around the arrow E, and the original ORG supported by the document glass 13 is irradiated with the light. Needless to say, the light can be transmitted through the document glass 13. Because the light distribution of the light emitted from the light source 1 is not even in the total length in the longitudinal direction of the light source 1, it is known that the light includes unevenness of illuminance in the longitudinal direction when the original ORG is irradiated. Therefore, the light distribution can be even on the original ORG by irradiating the original ORG with the light reflected from the reflector 2 at the same time.

The light reflected from the original ORG is reflected in the order of the first mirror 3, the second mirror 5, and the third mirror 6. Then, the image of the light is formed on the light-reception surface of the CCD sensor (line sensor) 9 through the condenser lens 8. For example, the CCD sensor 9 is a three-line CCD sensor in which the line sensor corresponding to each R, G, and B of three primary colors for use in additive color mixture is independently provided.

The light incident to the CCD sensor 9 is converted into an electric signal having a magnitude corresponding to light intensity by the CCD sensor board 10, and the electric signal is supplied to the control board 11. The CCD sensor board 10 holds the CCD sensor 9. The CCD sensor board 10 also includes at least a CCD sensor control circuit 10A which drives the CCD sensor 9 and a CCD driver 10B which receives directions (drive control signals) from the CCD sensor control circuit 10A to adjust drive conditions of the CCD sensor 9.

Figure 2:
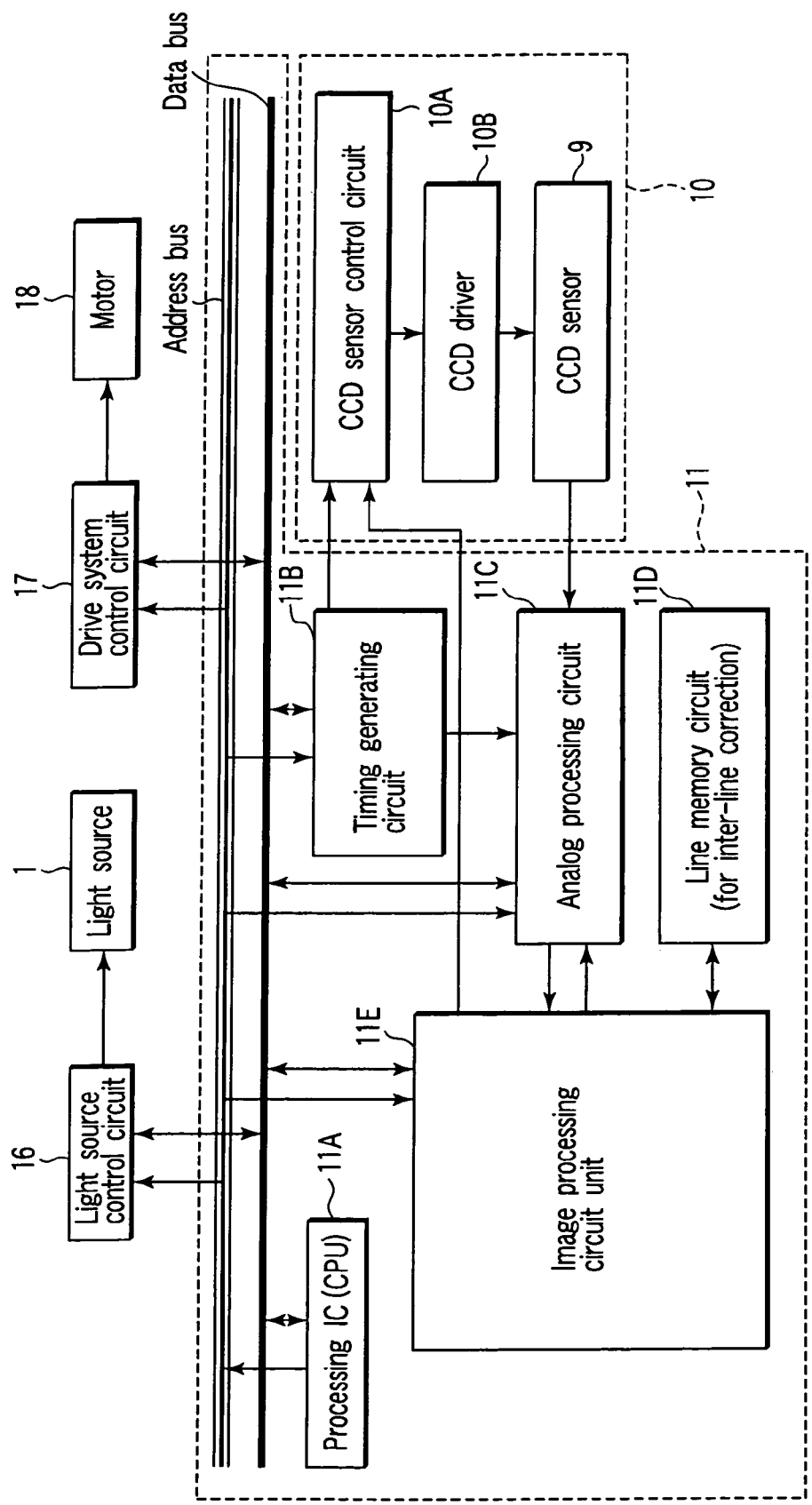
FIG. 2 is a block diagram for explaining an example of an image processing device incorporated into the image reading apparatus shown in FIG. 1.

FIG. 2 shows an example of an image processing device incorporated into the image reading apparatus shown in FIG. 1.

The control board 11 includes: a processing IC (CPU) 11A which processes the photoelectric conversion output output from the CCD sensor 9 according to a predetermined rule; a timing generation circuit 11B which generates various kinds of timing required for each action (process); an analog processing circuit 11C which converts R, G, and B analog signals from the CCD sensor 9 into digital signals; an image processing circuit unit 11E which performs image correction such as shading correction for correcting high-frequency and low-frequency distortions which are included in the digital signal output from the analog processing circuit 11C and/or inter-line correction for correcting line position shift among the R, G, and B line sensors; and a line memory circuit 11D which delays image data in unit of line during the inter-line correction.

The timing generation circuit 11B and the image processing circuit unit 11E are connected to the CCD sensor control circuit 10A mounted on the CCD sensor board 10. In addition to the CCD sensor 9 and the CCD sensor control circuit 10A, the CCD driver 10B is provided on the CCD sensor board 10.

The analog signal output from the CCD sensor 9 generally includes high-frequency distortion and low-frequency distortion. The high-frequency distortion is caused by variations in conversion efficiency of photoelectric conversion elements. Image light includes aberration caused by image formation through a reducing optical system with the condenser lens 8, which results in the low-frequency distortion. Accordingly, in many cases, normalization correction is performed to the analog signal output from the CCD sensor 9. In this case, data to be used as the reference is required. Generally, the reference data is intensity of the light reflected from the white reference plate 12, i.e., image data in taking the white reference plate 12.

Figure 3:
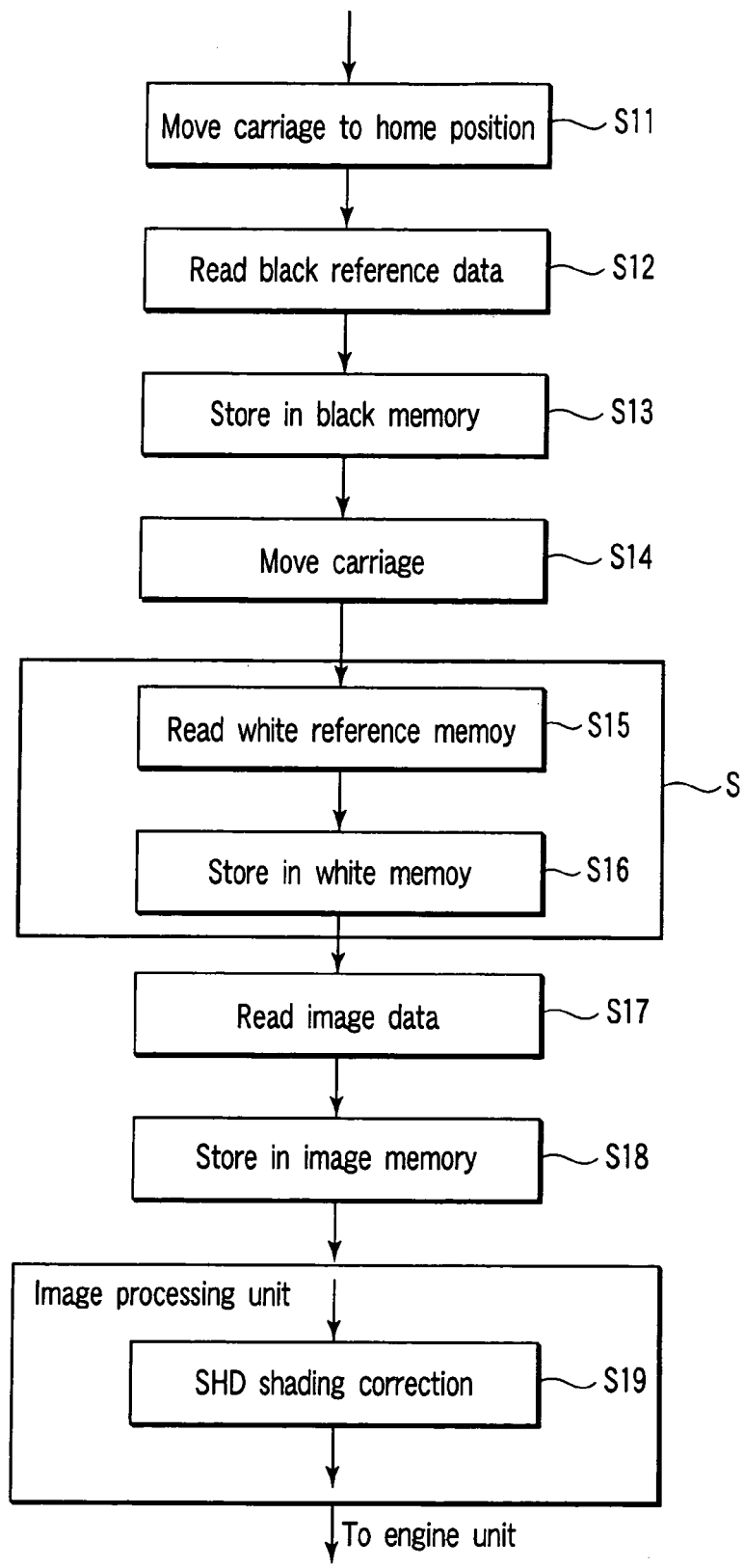
FIG. 3 is a flowchart showing an example an embodiment of the invention.

Referring to FIG. 3, a basic method for performing shading correction of the invention will be described below.

The first carriage 4 holding the light source (lamp) 1 is moved to a home position (not shown; a predetermined position on the opposite side of the read start position from the original ORG) (S11).

Then, black reference data necessary for the shading correction is read. A method of reading the black reference data includes a method in which, for example, a black reference plate is read while the light source (lamp) 1 is turned off (data during turning the lamp off is obtained from the CCD sensor), or the black reference plate is read while the light source 1 is turned on (S12).

The black reference data read in Step S12 is stored in a black memory (for example, "firmware in the image processing circuit unit 11E" shown in FIG. 2) (S13).

Then, the carriage 4 is moved to a position where the white reference plate 12 can be irradiated (S14).

Next, white reference data (hereinafter a value obtained by reading the white reference plate is referred to as white reference data) is read. A method of reading the white reference data includes a method in which, for example, the light source (lamp) 1 is turned on to read the white reference plate 12 (photoelectric conversion is performed to the light reflected from the white reference plate 12) (S15).

The read white reference data is stored in a white memory (for example, "firmware in the image processing circuit unit 11E" shown in FIG. 2), although detailed description is omitted (S16).

Then, the image information on the original (the reading object) ORG loaded on the document glass 13 is read (S17). Namely, the reflected light obtained by irradiating the original ORG with illuminating light of the lamp 1 is detected, and the image data is obtained by each line sensor (R line sensor, G line sensor, and B line sensor) of the CCD Sensor 9 (S17).

The image data read in Step S17 is stored in an image memory (for example, "firmware in the image processing circuit unit 11E" shown in FIG. 2) (S18). It is also possible that an image memory 11F is independently provided in the image processing apparatus shown in FIG. 2. In this case, the black reference data, the white reference data, and the image data are stored in the image memory 11.

In the image processing circuit unit 11E, the shading correction is performed to the black reference data, the white reference data, and the image data (S19). Since the shading correction is well-know technology, the explanation thereof is omitted.

The invention has the features in that the white reference data is read and the white reference data is stored in the white memory, which corresponds to a processing of an area S shown in FIG. 3.

When the white reference data for the shading correction is read, usually, the first carriage 4 is moved such that the light reflected from the white reference plate 12 can be detected, white reference data of the predetermined number of lines are read and averaged, and the averaged white reference data is stored in the white memory.

At this point, the foreign matter (dust, dirt and the like) which adhere to the white reference plate becomes troublesome.

The shading correction in the case where the foreign matters adhere to the white reference plate 12 will be described below.

As described above, the first carriage 4 is moved to the position where the light reflected from the white reference plate 12 can be detected, and the reflected light obtained when the white reference plate 12 is irradiated with the light from the lamp 1 is received by the CCD sensor 9. As a result, the white reference data is obtained.

Figure 4:
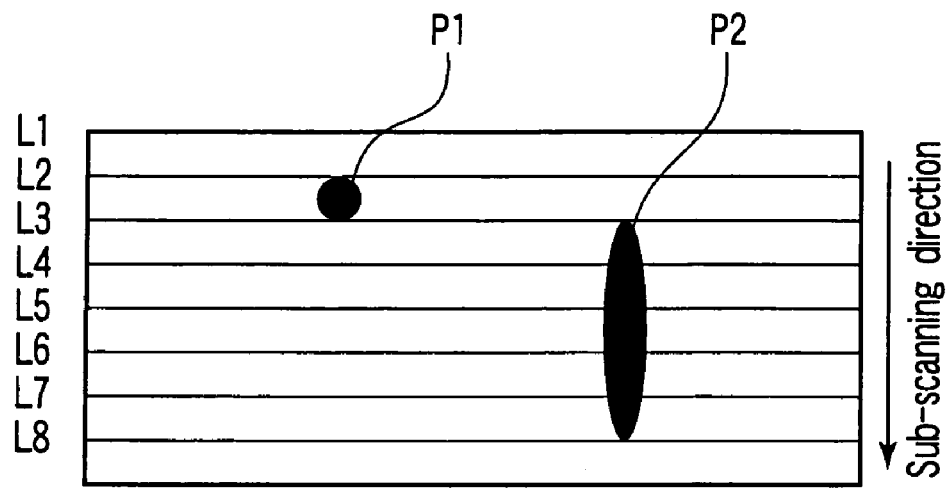
FIG. 4 is a schematic view showing an example of a reference plate read by the image reading apparatus shown in FIG. 1.

FIG. 4 shows a relationship between the read position of the white reference plate and the foreign matter which may adhere to the white reference plate.

For example, it is assumed that the values from L1 to L8 are averaged as a white reference value of the shading correction (hereinafter, the value obtained by dividing the read white reference data by the number of lines, i.e., the value actually used for the shading correction is referred to as white reference value).

Figure 5:
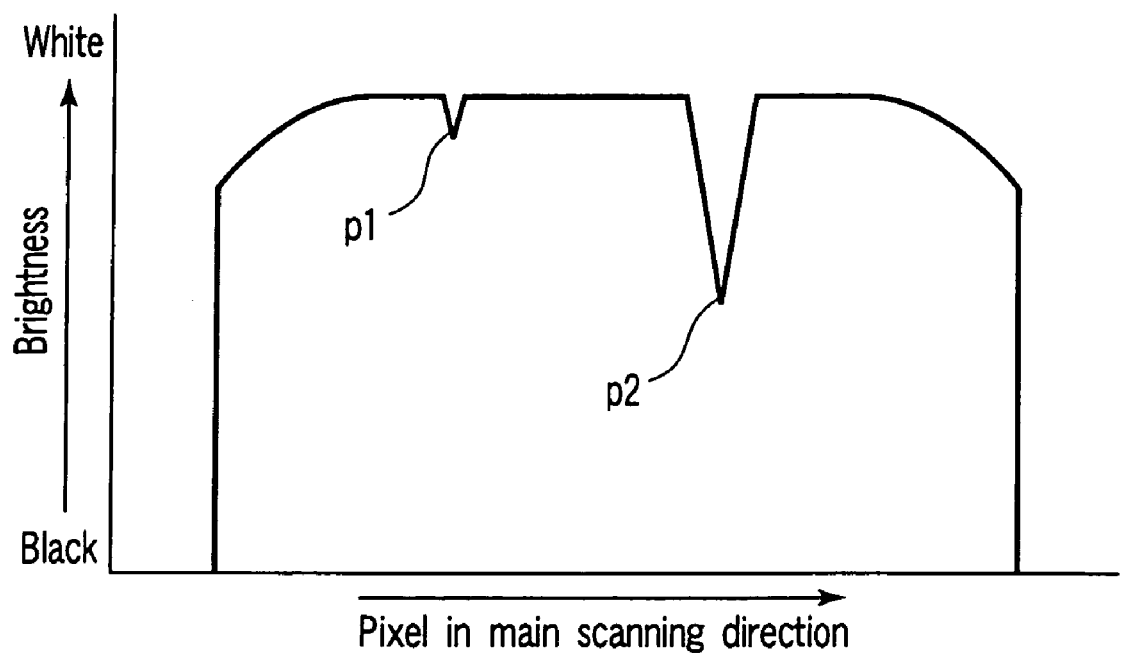
FIG. 5 is a schematic view showing a profile obtained from a read result shown in FIG. 4.

As shown in FIG. 4, in the case where foreign matter P1 adheres to a column L2 and foreign matter P2 adheres to lines L3 to L8, a profile when the white reference value is determined by the averaging the eight lines L1 to L8 is shown in FIG. 5. In FIG. 5, "p1" and "p2" correspond to P1 and P2 shown in FIG. 4, respectively.

When the foreign matter is not so large unlike P1 shown in FIG. 4, the white reference value is determined by averaging the eight lines. Therefore, only the portion where the foreign matter is located becomes slightly dark, which decreases brightness. For the large foreign matter located across the lines in the sub-scan direction like P2 shown in FIG. 4, the brightness is remarkably decreased when the white reference value is determined by averaging the eight lines. When the image shading correction is performed based on the white reference value shown in FIG. 5, the line is formed in the sub-scan direction of the image due to the decrease in brightness of the white reference value, which results in degradation of the image quality. As the brightness of the white reference value is decreased, the white of the reference becomes darker, and a white line is formed in the image, which leads to great degradation of the image quality.

In order to solve the problem, the method proposed below is used.

Referring to a flowchart shown in FIG. 6, the detection and removal of the read data in the case where the foreign matter adheres to the white reference plate for the shading correction of the invention will be described below.

Figure 6:
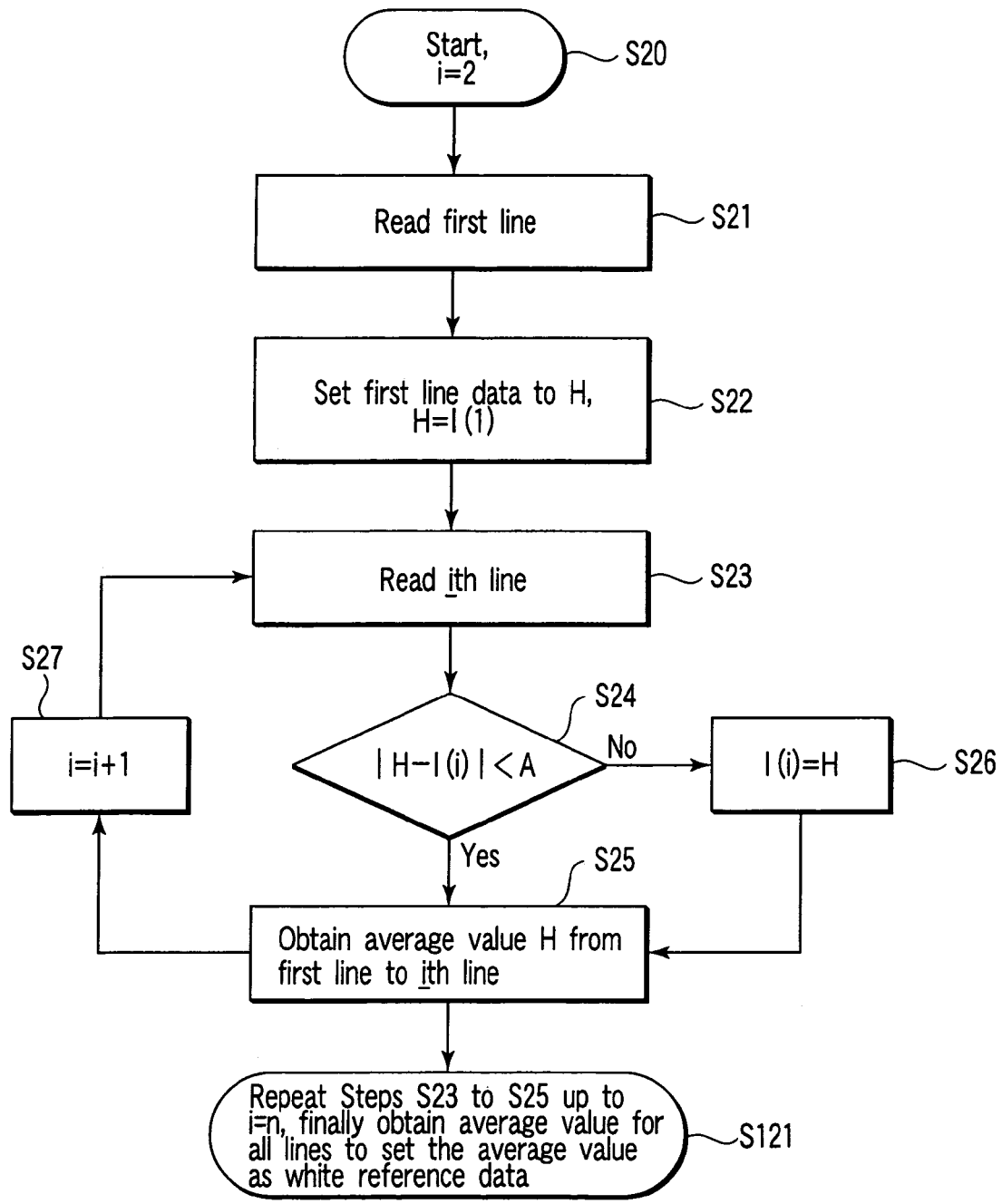
FIG. 6 is a flowchart showing an example of a routine for correcting the read result shown in FIG. 4.

In FIG. 6, it is assumed that i: a line (any one of lines L1 to L8) in which the read is being performed, I(i): image data of an ith line, H: an average value of the first line to the ith line in the sub-scan direction (if i=5, an average value of five lines), A: a threshold making determination of the foreign matter data, and n: the total number of lines to be read in order to determine the white reference value.

Assuming that i is set at 2 (S20), the first line is read (S21).

Since only the first line is read, the average value corresponds to the data of the first line. Therefore, H is set at I(1) (S22).

Then, the ith line is read (S23).

Then, an absolute value of difference between H and I(i) is obtained to compare the absolute value to the threshold A (S24).

In the following expression (1):

$$|H-I(i)|<A \qquad (1)$$

when |H−I(i)| is larger than the threshold A (No in Step S24), it is determined that I(i) is the area where the foreign matter exists (data in which the foreign matter is read), and data of I(i) is replaced with H (S26). On the other hand, when |H−I(i)| is lower than the threshold A, it is determined that the normal read is performed, and I(i) is directly used as is (Yes in Step S24).

The average value H is obtained up to the ith line (S25). Then, Steps S23 to S26 are repeated by incrementing i by 1 (S27).

By performing the process, the data in which the foreign matter is read can be replaced with the data in which the data are averaged before the data in which the foreign matter is read, so that the image-quality degradation caused by the foreign matter on the reference plate can be prevented. The shading correction can be performed by using the average value H from the first line to the nth line as the white reference value.

In this process, the average value H used as the reference is not kept constant, but the average value H is updated according to the read, which allows the process to be performed in real time for the foreign matter located at the read position of the white reference plate.

Then, the case where the white reference plate shown in FIG. 4 to which the foreign matter adheres is read by the above-described method will be described in detail.

The data of the line L1 in the sub-scan direction is read to set the read data of the line L1 at the average value in the main scan direction.

Then, the line L2 is read.

At this point, according to the expression (1) ($|H-1(i=L2)|<A$), it is determined that the foreign matter P1 is the foreign matter, and the average value is replaced with the same average value as for the line L1.

When the line L3 where the foreign matter P2 exists is read, according to the expression of $|H-1(i=L3)|<A$, the average value is replaced with the average value of lines L1 and L2.

Similarly, the average value of the line L4 is replaced with the average value of the lines L1 to L3, the average value of the line L5 is replaced with the average value of the lines L1 to L4, the average value of the line L6 is replaced with the average value of the lines L1 to L5, and the average value of the line L7 is replaced with the average value of the lines L1 to L6.

When the read is ended up to line L8, the average value H(L8) is set at the white reference value.

Figure 7:
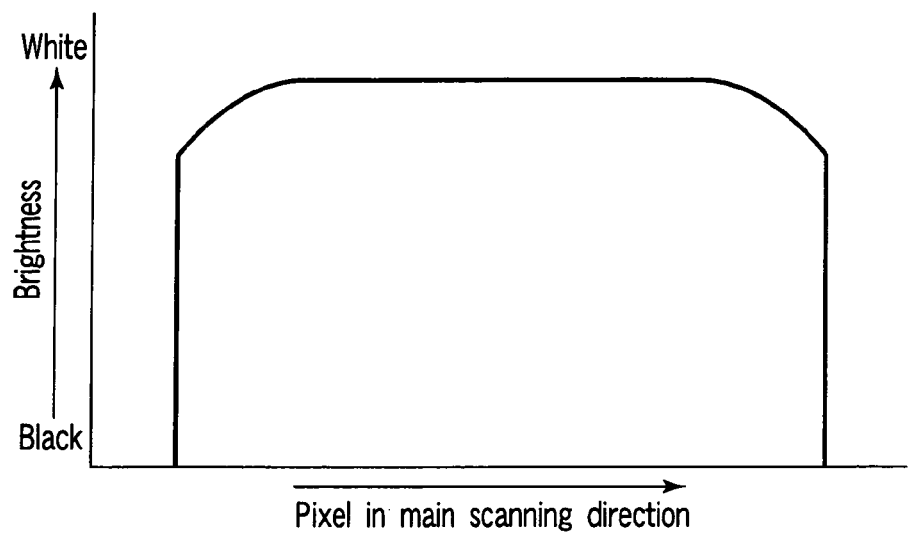
FIG. 7 is a schematic view showing a profile obtained by correcting the profile shown in FIG. 5 with the correction routine shown in FIG. 6.

In the case of using the above-described method, the white reference data shown in FIG. 7 is produced as the profile when the white reference value is produced by the average value (the profile shown in FIG. 5 is converted into the profile shown in FIG. 7).

According to the method, the image-quality degradation caused by the foreign matter on the reference plate can be prevented.

Since the correction is performed based on each read data in the method, the white reference value can be obtained independently of the kind of the sensor, such as a color image reading apparatus in which a RED reading sensor (R line sensor), a GREEN reading sensor (G line sensor), and a BLUE reading sensor (B line sensor) are used, and a monochrome image reading apparatus in which a BLACK reading sensor (not shown) is used.

Figure 8:
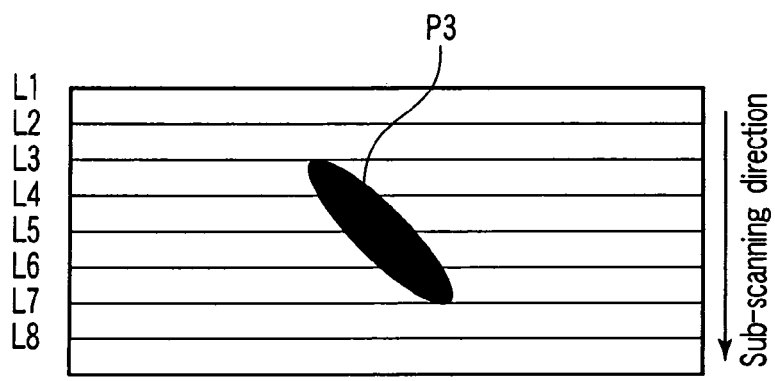
FIG. 8 is a schematic view showing an example of a reference plate read by the image reading apparatus shown in FIG. 1.
Figure 9:
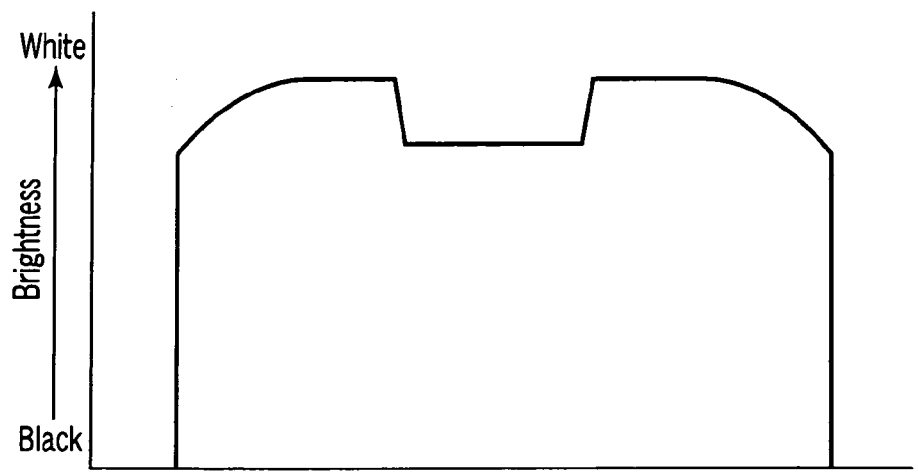
FIG. 9 is a schematic view showing a profile obtained from a read result shown in FIG. 8.

The foreign matter which is located not only across the plural lines in the sub-scan direction but also across the plural lines in the main scan direction exists as shown in FIG. 8. In this case, when the white reference value is determined by the average of the eight lines, the profile shown in FIG. 9 is obtained.

In the invention, since the process is performed in each line in the main scan direction, the foreign matter can be detected and the suitable correction can be performed regardless of the sizes and the lengths of the foreign matter. The foreign matter includes foreign matter which is lengthened in the sub-scan direction, foreign matter which is lengthened in the main scan direction, and foreign matter which is lengthened both in the sub-scan direction and the main scan direction.

Figure 10:
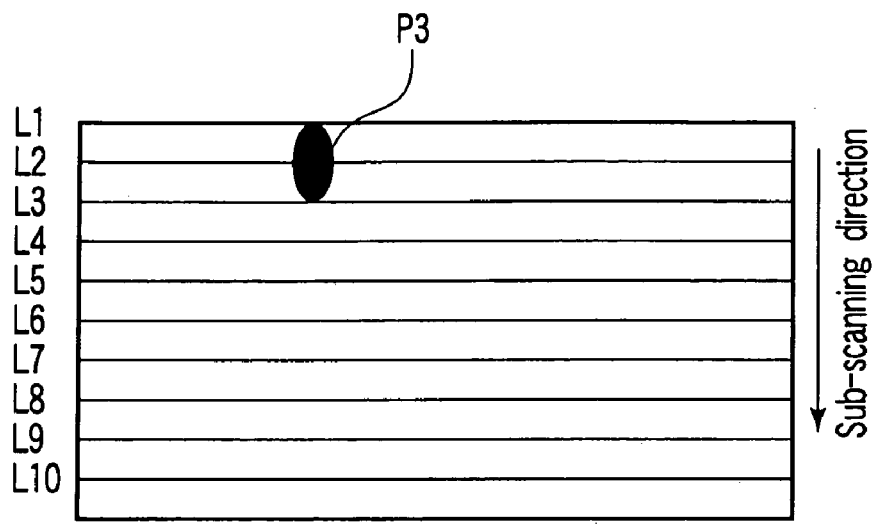
FIG. 10 is a schematic view showing an example of a reference plate read by the image reading apparatus shown in FIG. 1.

As shown in FIG. 10, there is the exceptional case in which the foreign matter adheres to the first line of the white reference plate read position. In the exceptional case, the profile shown in FIG. 11 is obtained.

Figure 11:
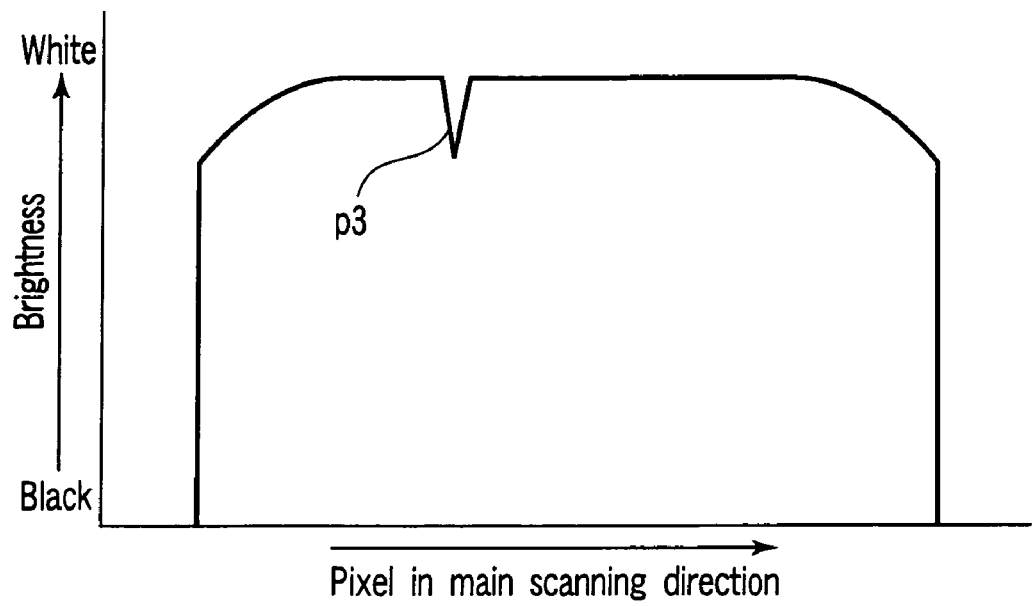
FIG. 11 is schematic view showing a profile obtained from a read result shown in FIG. 10.

It is difficult that the profile shown in FIG. 11 is solely distinguished from the profile shown in FIG. 5. The flowchart shown in FIG. 12 is the method for correcting the profile shown in FIG. 11.

In the case where the foreign matter exists in the first line (L1) in the white reference data which is read in the same way as for the above-described method, the line is formed in the sub-scan direction of the image due to the decrease in brightness level of the white reference value when the shading correction is performed by directly using the read data, which results in the image-quality degradation.

Figure 12:
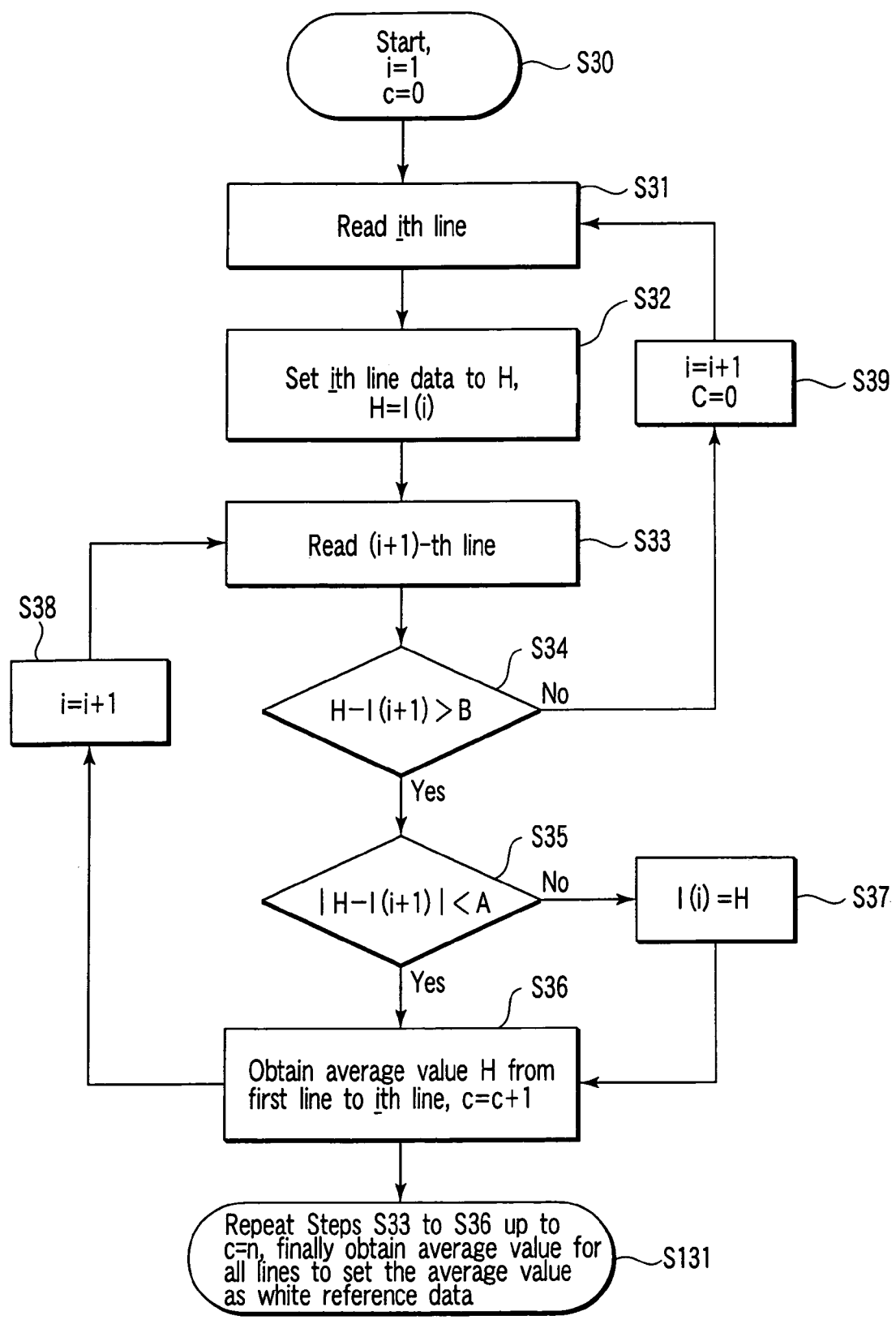
FIG. 12 is a flowchart showing an example of a routine for correcting the read result shown in FIG. 11.

In order to solve the problem, the method shown in FIG. 12 is adopted as follows: it is assumed that i: the number of lines in which the read is being performed, c: a counter of the number of lines in which the read is being performed, I(i): data of an ith line, H: an average value of the first line to the ith line in the sub-scan direction (if i=5, an average value of five lines), A: a threshold 1 making determination of the foreign matter data, B: a threshold 2 making determination of the foreign matter data, and n: the total number of lines to be read in order to determine the white reference value.

Assuming that i is set at 1 and c is set at 0 (S30), the first line is read (S31).

Since the average value of the first line is same as the data of the first line, H is set at I(1) (since there is only one line, the average value of the first line corresponds to the data of the first line, so that H is set at I(1) (S32)).

Then, the (i+1)-th line is read (S33).

Then, the difference between H and I(i) is compared to the threshold B. At this point, using the following expression (2), it is determined whether or not the first line data I(1) is the data in which the foreign matter is read:

$$H-I(i+1)>B \qquad (2)$$

Usually, the white reference data has a high value in the brightness because the reference for the white is read. The difference value becomes negative, when not only the average value H is the data in which the foreign matter is read but also the value I(i+1) is the data in which the normal white reference plate is read (S34). On the other hand, as described above, when H−I(i+1) is more than the threshold B, it is determined that the average value H is not the data in which the foreign matter is read, and the flow goes to the next Step S35 (Yes in Step S34). Therefore, the negative value is set at the threshold B, and it is determined that the average value H is the data in which the foreign matter is read, when the average value H is not more than the threshold B (No in Step S34). In this case, c is set at 0 and i is set at i+1, and the flow returns to the first step (S39).

When H−1(i) is larger than the threshold B in Step S34 (Yes in Step S34), it is determined whether or not |H−1(i)| is larger than the threshold A (S35). Namely, when |H−1(i)| is larger than the threshold A, it is determined that I(i) is the data in which the foreign matter is read (the foreign matter exists on the read line), and I(i) is replaced with the average value H (No in Step S35).

When |H−I(i)| is smaller than the threshold A (Yes in Step S35), it is determined that the normal read is performed, and I(i) is directly used as is.

Then, the absolute value of the difference between H and I(i) is obtained to compare the absolute value to the threshold A. As described above, according to the expression (1), when

|H−I(i)| is larger than the threshold A (No in Step S35), it is determined that I(i) is the data where the foreign matter is read, and I(i) is replaced with the average value H (S37):

$$|H-I(i)|<A \quad (1)$$

When |H−I(i)| is smaller than the threshold A (Yes in Step S35), it is determined that the normal read is performed, and I(i) is directly used as is.

The average value H is obtained up to the ith line, and then the operation is repeated setting c=c+1 and i=i+1 (S36).

Accordingly, the data in which the foreign matter is read can be replaced with the data in which the data are averaged before the data in which the foreign matter is read, so that the image-quality degradation caused by the foreign matter on the reference plate can be prevented.

In this case, "c" acts as a counter. For example, when the white reference value is determined by averaging the eight lines, the operation is repeated until "c" becomes 8. At this point, when the foreign matter exists in the first read position, it is necessary to read the data of nine lines or more. In the method, however, the average value H which is of the reference of the comparison is always updated. Therefore, it is not necessary to increase the storage capacity for the shading correction, and a good white reference value can be obtained.

Next, the case where the white reference plate shown in FIG. 10 to which the foreign matter adheres is read by the above-described method will be described in detail.

The read data of the line L1 in the sub-scan direction is set at the average value in the main scan direction. Then, the line L2 is read.

Since the foreign matter P3 is located across the lines L1 and L2, according to the expressions of H−I(i+1)<B and |H−I(i=L2)|<A, it is not determined that foreign matter P3 is the foreign matter, and the flow goes to the next process.

When the line L3 is read, in the line in the sub-scan direction in which the foreign matter P3 exists, it is determined that the foreign matter P3 is the foreign matter according to the expression of |H−1(i+1)|<B.

At this point, the data of the lines L1 and L2 where the foreign matter P3 exists are deleted, and the data of the line L3 is newly used as the reference data.

With the method, the white reference value is determined by averaging the data of lines L1 to L8 except for the white reference value to which the foreign matter P3 adheres in the sub-scan direction, and the white reference value to which the foreign matter P3 adheres in the sub-scan direction is determined by averaging the data of lines L3 to L10.

In this case, it is necessary to extend the white reference plate read range by two lines. However, since the reference data is always updated, excessive line memory is not required, and the image-quality degradation caused by the foreign matter on the reference plate can be prevented.

Since the correction is performed for each piece of read data in the method, a good white reference value can be obtained without restricting the kinds of sensor, such as a color image reading apparatus in which a RED reading sensor, GREEN reading sensor, and BLUE reading sensor are used, and a monochrome image reading apparatus in which a BLACK reading sensor is used. In the embodiment, the white reference value is determined by the data of the lines L3 to L10 when the foreign matter adheres to the lines L1 and L2. However, when the white reference plate read range is desired not to be variable, it is possible that the data in which it is determined by the expression of H−I(i+1)<B that the that data is the foreign matter is filled with the data of the next line, or it is possible that the average value from the next line to the line L8 is determined to fill the line L1 and L2 with the average value.

It is preferable to inform a user of contents of the detection and the correction of the foreign matter on the white reference plate. When the foreign matter is detected and the correction is performed in reading the white reference plate, it is useful to inform the user of the presence or absence of the correction by displaying a message that correction of the reference plate has been performed or the like by use of the display device 111 (see FIG. 2) or a lamp (not shown). The control device (main control unit) 101, which is connected to the image processing circuit unit 11E and the processing IC (image processing CPU) 11A through the data bus, easily causes the display device 111 to display the message.

Displaying the message can inform the user whether or not the reference plate is soiled, and the user can determine whether or not the image quality in which the correction is performed satisfies the user.

In the method for performing the detection and removal of the foreign matter and correction according to the invention, the size and quantity of foreign matter adhering to the white reference plate in the sub-scan direction and the size and quantity of foreign matter adhering to the white reference plate in the main scan direction can be obtained by the number of determination whether or not the size of the foreign matter adhering to the white reference plate satisfies the expression of |H−1(i)|<A.

For example, it is possible that the informing method is divided into three stages (in this case, a correction level 1, a correction level 2, and a correction level 3 are set) according to the size of the foreign matter. In the case where the correction is performed to the small foreign matter, the correction level 1 is displayed. In the case where the correction is performed to the foreign matter having the size to a certain extent, the correction level 2 is displayed. In the case where the correction is performed to the large foreign matter, the correction level 3 is displayed. Therefore, the user can be made to take notice.

In the display of the correction level, for example, even if the correction level 3 is displayed because large foreign matter exists on the white reference plate for use in the shading correction, it is useful to decrease wiping of the reference plate or a service call when the user is satisfied with the image quality.

Conversely, even if the correction level 1 is displayed because small foreign matter exists on the white reference plate, the user can handle the problem such that the reference plate is wiped or a service call is placed when the user is not satisfied with the image quality.

Thus, a good white reference value can be obtained regardless of the size of the foreign matter adhering to the white reference plate.

Since the average value is updated in real time without having the fixed reference value, the storage capacity of the line memory can be decreased. The finally updated average value can directly be used as the white reference value for the shading correction.

Even if the foreign matter adheres to the first line of the white reference plate read position, the two determination expressions enable detection and correction, and a good white reference value can be obtained.

Whether or not detection and correction of foreign matter adhering to the white reference plate is performed is displayed, and the size of the foreign matter is divided into several levels. Consequently, the user can determine whether or not the user is satisfied with the image quality.

As described above, in the image processing apparatus and the image processing method of the invention, a good white reference value can be obtained regardless of the size of the foreign matter which may adhere to the white reference plate.

Since the average value is updated in real time without having the fixed reference value, the storage capacity of the line memory can be decreased. The finally updated average value can be directly used as the white reference value for the shading correction.

Even if the foreign matter adheres to the first line of the white reference plate read position, the two determination expressions enable detection and the correction, and a good white reference value can be obtained.

Further, whether or not detection and correction of foreign matter adhering to the white reference plate are performed is displayed, and the size of the foreign matter is divided into several levels. Consequently, the user can determine whether or not the user is satisfied with the image quality.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
   a CCD sensor which includes at least one line sensor, and which performs photoelectric conversion of image information of a reading object to output an electric signal corresponding to the image information;
   an average value computing unit which determines an average value of read values in each line of a reference plate when shading correction is performed using the read value obtained by reading the reference plate with the CCD sensor;
   a comparison computing unit which compares the average value computed by the average value computing unit to data of a next read position;
   a determining unit which determines whether or not foreign matter adheres to the reference plate based on the comparison result of the comparison computing unit; and
   a control unit which repeats the computation of the average value by the average value computing unit, the data comparison by the comparison computing unit, and the determination by the determining unit up to the necessary number of lines.

2. An image processing apparatus according to claim 1, wherein the comparison computing unit compares an absolute value of the difference to a predetermined threshold.

3. An image processing apparatus according to claim 1, further comprising a reference value control unit which, when the determining unit determines that foreign matter adheres to the reference plate, uses the average value used for the determination of whether or not foreign matter adheres to replace the data in which the foreign matter is read.

4. An image processing apparatus according to claim 3, wherein, when the determining unit determines that foreign matter adheres to the reference plate, the reference value control unit cancels data in which a position to which the foreign matter adheres is read and reads a reference value of the reference plate from the next data.

5. An image processing apparatus according to claim 1, wherein the control unit can inform of the data in which the reference value is read of a range where correction of foreign matter has been performed with respect to a size of the foreign matter and a correction range.

6. An image processing apparatus comprising:
   a CCD sensor which includes at least one line sensor and which performs photoelectric conversion of image information of a reading object to output an electric signal corresponding to the image information;
   an average value computing unit which determines an average value of read values in each line of a reference plate when shading correction is performed using the read value obtained by reading the reference plate with the CCD sensor;
   a comparison computing unit which compares the average value computed by the average value computing unit to data of a next read position;
   a determining unit which determines whether or not foreign matter adheres to the reference plate based on the comparison result of the comparison computing unit;
   a control unit which repeats the computation of the average value by the average value computing unit, the data comparison by the comparison computing unit, and the determination by the determining unit up to the necessary number of lines; and
   a comparing unit which determines whether or not the average value which becomes a first reference is data in which foreign matter is read.

7. An image processing apparatus according to claim 6, wherein the comparison computing unit compares an absolute value of the difference to a predetermined threshold.

8. An image processing apparatus according to claim 6, further comprising a reference value control unit which, when the determining unit determines that foreign matter adheres to the reference plate, uses the average value used for the determination of whether or not the foreign matter adheres to replace the data in which foreign matter is read.

9. An image processing apparatus according to claim 8, wherein, when the determining unit determines that foreign matter adheres to the reference plate, the reference value control unit cancels data in which a position to which the foreign matter adheres is read and reads a reference value of the reference plate from the next data.

10. An image processing apparatus according to claim 6, wherein the control unit can inform of the data in which the reference value is read of a range where correction of foreign matter has been performed with respect to a size of the foreign matter and a correction range.

11. An image processing method comprising:
    including at least one line sensor, and performing photoelectric conversion of image information of a reading object to obtain an electric signal corresponding to the image information;
    determining an average value of read values in each line of a reference plate when shading correction is performed using the read value obtained by reading the reference plate;
    comparing the average value computed by an average value computing unit to data of a next read position;
    determining whether or not foreign matter adheres to the reference plate based on the comparison result; and
    repeating the computation of the average value, the data comparison and the determination up to the necessary number of lines.

12. An image processing method according to claim 11, wherein, in the determination based on the comparison result, assuming that i is a line in which a read is being performed, I(i) is image data of an ith line, H is an average value of a first line to the ith line in a sub-scan direction, A is a threshold making determination of foreign matter data, and n is the total number of lines to be read in order to determine a white reference value;

reading the first line to replace H with I(1);

reading an (i+1)-th line;

making an absolute value of difference between H and I(i) to compare |H−I(i)| to the threshold A; and determining that foreign matter exists in an area (data in which foreign matter is read) when |H−I(i)|<A, and replacing the data of I(i) with H.

13. An image processing method according to claim 11, wherein, in the determination based on the comparison result, assuming that i is the number of lines in which a read is being performed, c is a counter of the number of lines in which the read is being performed, I(i) is data of an ith line, H is an average value of a first line to the ith line in a sub-scan direction, A is a threshold 1 making determination of foreign matter data, B is a threshold 2 making determination of foreign matter data, and n is the total number of lines to be read in order to determine a white reference value;

setting i to 1 and setting c to 0, and reading the first line to replace H with I(1);

reading an (i+1)-th line;

comparing the difference between H and I(i) to a threshold B;

determining whether or not the first line data is the data in which foreign matter is read by H−I(i+1)>B; and when the difference between H and I(i) is larger than the threshold value B, determining that H is not the data in which foreign matter is read.

* * * * *